INVENTOR.
OTTAVIO ZANCAN
ATTORNEY

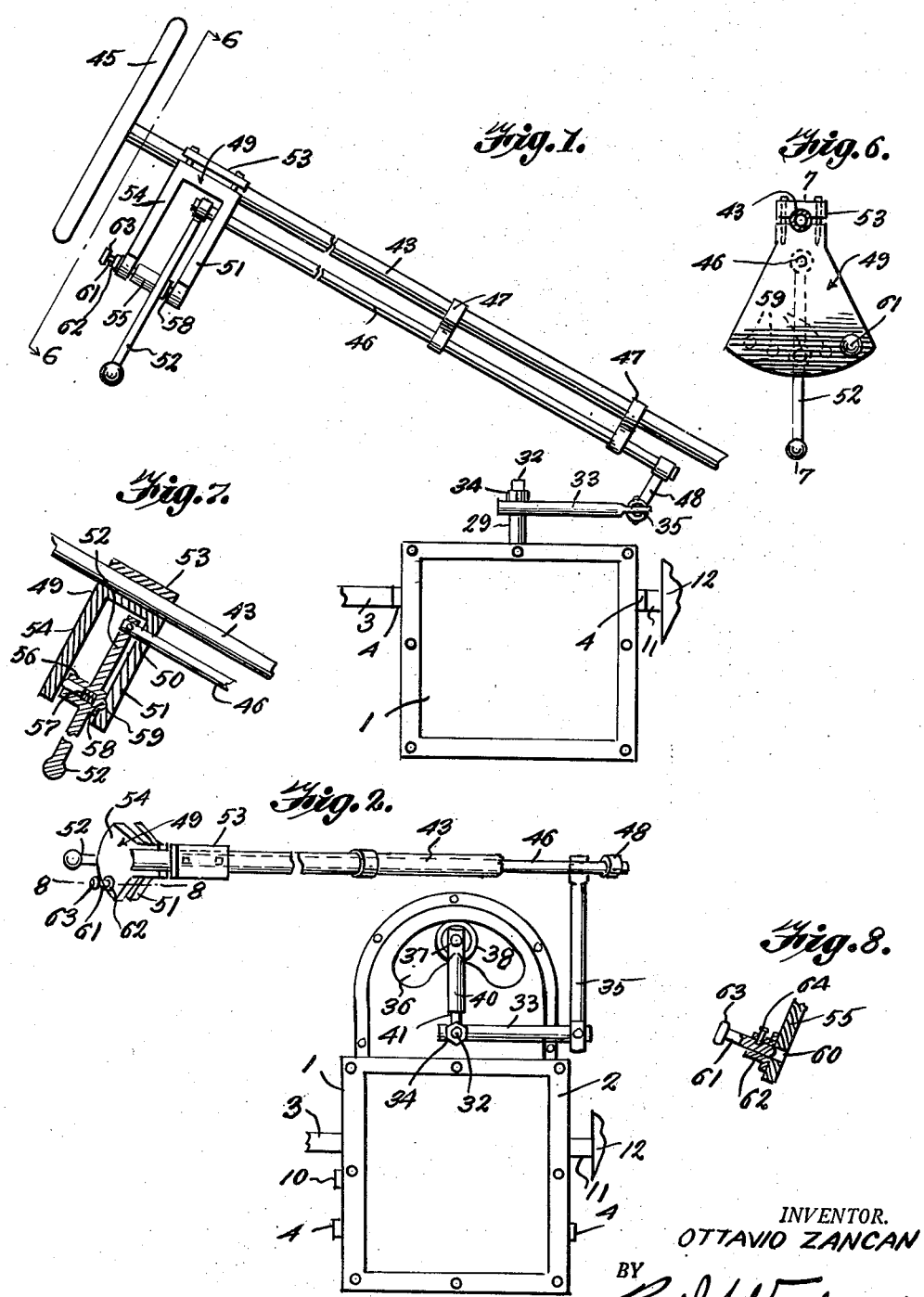

Patented July 10, 1951

2,560,321

UNITED STATES PATENT OFFICE 2,560,321

TRANSMISSION CONTROL

Ottavio Zancan, New York, N. Y.

Application October 4, 1950, Serial No. 188,338

4 Claims. (Cl. 74—473)

This invention relates to a transmission of the type covered by my prior Patents 2,403,162 issued July 2, 1946, and 2,489,735 issued November 29, 1949, and it is one object of the invention to provide a transmission which is particularly adapted for use upon motor vehicles and includes in its construction a box of gears and a lever for shifting certain of the gears to positions for obtaining predetermined speeds, there being improved actuating means for imparting tilting movement to the lever and shifting the gears to the adjusted positions.

Another object of the invention is to provide a transmission of this type wherein the lever has pivotal movement about a pivot and also is slidable longitudinally as it tilts about the pivot, thus allowing a roller carried by a rod projecting from the lever to follow an arcuate slot formed in a plate or bracket through which the rod passes.

Another object of the invention is to provide operating mechanism wherein movement of the rod and its roller through the arcuate slot is accomplished by means of a link consisting of upper and lower sections which are one connected with the rod and another with a shaft which is rotatably mounted and carries at its outer end an arm or lever by means of which turning movement is imparted to the shaft, said shaft having a portion passing through the slot of the gear shifting lever and serving as a pivot for the same.

Fig. 1 is a side view showing the transmission box and actuating mechanism carried by the steering post in side elevation.

Fig. 2 is a top plan of the transmission mechanism shown in Figure 1.

Fig. 6 is a view taken along the line 6—6 of Figure 1 and looking towards the operating mechanism carried by the steering post.

Fig. 7 is a sectional view taken along the line 7—7 of Figure 6.

Fig. 8 is a fragmentary sectional view taken along the line 8—8 of Figure 2.

Another object of the invention is to provide a transmission including gear shifting mechanism which is simple in construction and very efficient in operation.

Figure 3:
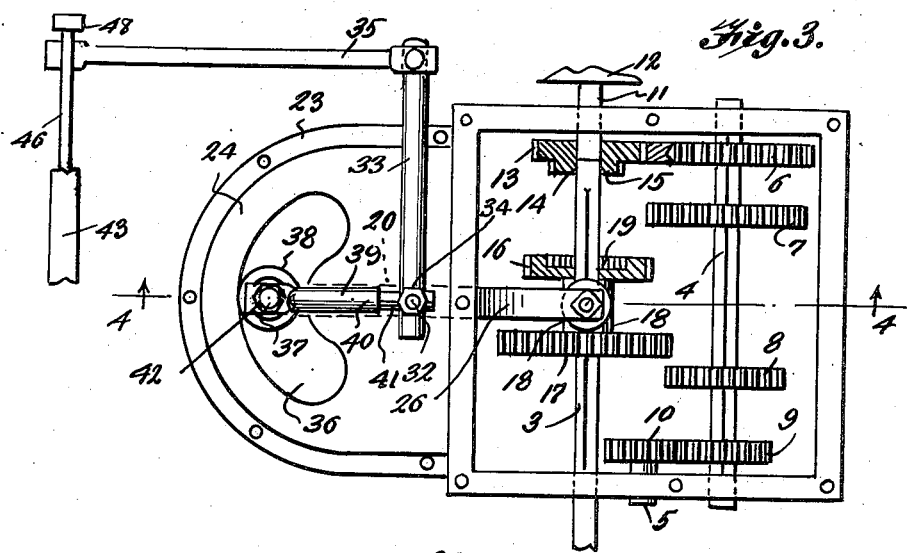
Fig. 3 is a view upon an enlarged scale showing the cover of the gear box removed and the gears and associate mechanism in top plan with one gear in section.
Figure 4:
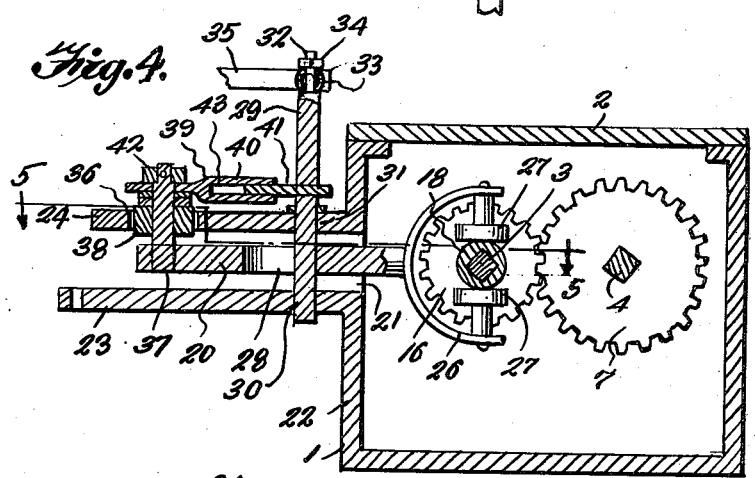
Fig. 4 is a vertical sectional view taken along line 4—4 of Figure 3.
Figure 5:
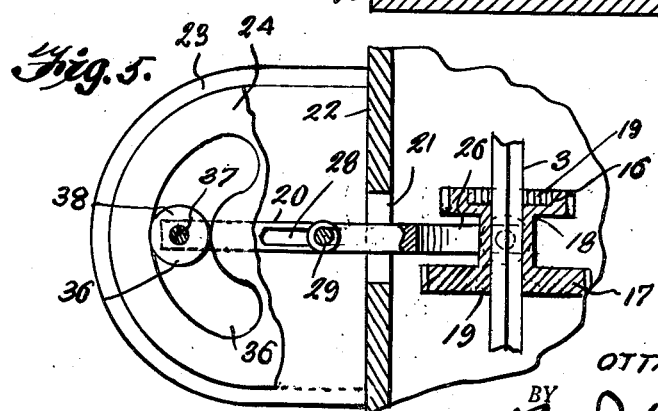
Fig. 5 is an enlarged fragmentary sectional view taken along the line 5—5 of Figure 4.

The invention is illustrated in the accompanying drawings wherein:

The gear box 1 may be of any dimensions desired and is open at its top, as shown in Figure 3, this open top of the box being normally closed by a removable cover or closure plate 2. A main shaft 3 extends longitudinally through the box and is rotatably mounted through the front end wall thereof. This shaft may be connected with or from a portion of the transmission shaft of a motor vehicle, and within the box is rectangular in cross section so that gears mounted upon the shaft will turn with the shaft but may be slid along the shaft to adjusted position. A countershaft 4, which is also rectangular in cross section, is rotatably mounted in the box between the front and rear walls thereof and extends longitudinally in the box in spaced relation to one side of and parallel to the main shaft. There has also been provided a stub shaft 5 which is rotatably mounted through the rear end wall of the box. Gears 6, 7, and 8 of progressively decreasing diameters are mounted upon the countershaft 4 in spaced relation to each longitudinally thereof and as the shaft is square in cross section, the shaft and the gears turn together. While the shaft has been shown square in cross section it will be understood that the shaft may be circular in cross section and the gears keyed to it. A small gear 9 carried by the rear end portion of the countershaft meshes with a gear 10 carried by the stub shaft 5.

A shaft 11 with which the clutch 12 is connected is journaled through the front end wall of the box and carries a gear 13 which meshes with the gear 6 and is formed at its center with a socket 14, into which the front end of shaft 3 rotatably fits the socket being surrounded by a circular clutch member 15 having teeth about its periphery. The shaft 3 carries gears 16 and 17 which are connected by a neck or sleeve 18 and turn with but are slidable along the shaft. The gear 16 and the gear 17 form a compound gear and the gear 16 has a side face confronting the gear 13 formed in its central portion with a circular socket 19 having clutch teeth about its periphery, the socket being of such diameter that it will snugly receive the clutch member 14 when the compound gear is shifted forwardly along the shaft to a position in which it is disposed close against the gear 13. The gears 16 and 17 are of such diameter that they may be intermeshed respectively with the gears or pinions 7 and 8.

When the compound gear is moved along the shaft 3 to a position in which the clutch member 15 fits within the socket 19 the gear 16 will be disposed between the gears 6 and 7, where it is out of mesh with gear 7 and the main shaft 3 will be rotated at high speed by direct transmission of rotary movement from the shaft 11 to the main shaft through the interlocked gears 13 and 16.

When the compound gear is moved along the shaft to a position in which the gear 16 meshes with gear 7 rotary motion is transmitted from shaft 11 through the countershaft 4 to the main shaft at second speed and when the compound gear is in a position in which the gear 17 meshes with the small gear 8 rotary motion is transmitted to the main shaft at low speed.

When the compound gear is in a position disposing the gears 16 and 17 in straddling relation to the gear 8 and out of mesh with both the gears 7 and 8 it is in idling position and no rotary motion will be transmitted to the transmission shaft.

The compound gear may also be moved to a position close to the rear wall of the gear box and in which position the gear 17 meshes with the reversing gear 10 and rotary motion of the main shaft 3 will then be in reverse and the motor vehicle may be backed.

It will thus be seen that by shifting the compound gear forwardly along the main shaft from the idling position towards the high speed position, the operator of a motor vehicle may cause the vehicle to progressively move at low speed, then at second speed, and finally at high speed, the speed being progressively reduced from high speed to low speed and to idling when the compound gear is moved along the main shaft towards the rear end thereof. Further movement of the compound gear rearwardly along the main shaft will dispose it in a reversing position in which it meshes with gear 10 and the vehicle will be backed. This arrangement of the gears eliminates any danger of the compound gear being accidently moved to a reversing position when it is intended to shift from low speed to second speed and high speed, and stripping of the gears will not occur.

In order to shift the compound gear along the main shaft there has been provided operating mechanism including a lever 20. This operating lever is disposed horizontally transversely of the main shaft and passes through an opening 21 formed in the side wall 22 of the box 1 between plates 23 and 24 carried by this wall. A fork 26 at the inner end of the lever extends transversely thereof in straddling relation to the main shaft 3 and the compound gear and is disposed between the gears 16 and 17. Rollers 27 which are disposed inwardly of the fork are rotatably carried by the arms of the fork near their free ends. When the lever is tilted towards one end of the box or the other the rollers will apply pressure to the compound gear and shift it longitudinally of the main shaft. Externally of the box the lever 20 is formed with a longitudinally extending slot 28 through which passes a vertical shaft 29 rotatably mounted through aligned openings 30 and 31 formed in the plates 23 and 24 and having one end projecting upwardly from the box and reduced in diameter to form a stem 32 upon which an actuating handle or lever 33 is mounted and secured by a nut 34 or in any other desired manner.

The handle 33 extends forwardly from the shaft 29 and to it is pivotally secured a rod or link 35 which is shiftable longitudinally so that swinging movement may be imparted to the handle and rotary movement imparted to the shaft in a predetermined direction according to the direction in which the link 35 is moved. A slot 36 is formed through the plate 24 and extends transversely thereof near its outer end. This slot is substantially arcuate but has its end portions extending diagonally towards opposite side edges of the plate. A pivot pin or rod 37 extends laterally from the outer end of the lever 20 and passes through the slot 36, and this rod or pin carries a roller 38 which is of such diameter that it fits snugly in the slot but may turn freely about the rod. Therefore the roller may guide tilting movement of the lever 20 and cause it to shift longitudinally as the roller moves longitudinally of the slot towards one end or the other thereof. A link 39 extends horizontally between the shaft 29 and the rod 37 and has companion sections 40 and 41, the outer section 40 being firmly secured to the rod 37 by a nut 42 and the inner section 41 being rigidly secured about the shaft 29 and slidably fitting into a longitudinally extending socket 43 formed in the outer section. It will thus be seen that the two sections have telescoping engagement with each other so that when the link 39 is swung transversely during turning movement of the shaft the overall length of the link will gradually change and the roller 38 will be allowed to follow the slot 36 from one end of the slot to the other end thereof. Therefore longitudinal shifting of the lever 20 will not be interfered with and the lever may have tilting movement about the shaft and its rollers 27 remain in their proper position between the gears 16 and 17 at diametrically opposite sides of the main shaft 3 and the neck 18.

The link 35 is of such length that its outer end terminates under the steering post 43 through which is mounted the usual steering shaft carrying a steering wheel 45 at its upper end. Under the steering post is an operating shaft 46 which is rotatably mounted in a suitable number of brackets 47 carried by the steering post and spaced from each other longitudinally thereof. An arm 48 extends from shaft 46 and is pivotally connected with the outer end of link 35 and when the shaft is turned in the brackets the link will be shifted longitudinally and swinging movement imparted to handle 33 and impart movement to the link 39 and the lever 20 as previously described.

The upper or rear end of the operating shaft 46 extends into a frame 49 through an opening 50 in the lower plate 51 thereof and carries a handle 52 by means of which the shaft is turned. The bracket is secured to the steering post by a clamp 53 and has an upper wall 54 spaced from the lower wall. Intermediate its length the handle 52 is formed with a socket 55 in which is slidably mounted a plunger 56 urged outwardly by a spring 57. Under the socket the handle is formed with lug or tooth 58 for engaging in recesses or seats 59 formed in an arcuate path in the upper surface of the wall or plate 51. The spring holds the plunger 56 against the under surface of the upper plate or wall 54 and urges the handle downwardly and this causes the tooth 58 to engage in the seats 59 and releasably hold the handle in adjusted positions. As the handle is lifted to shift its tooth out of position to engage in the recesses or seats 59 the handle may be swung transversely of the frame 49 without noise by the tooth moving into and out of the seats while adjusting gears.

An opening 60 is formed through the upper plate 54 so that as the handle is moved from the neutral position towards the reversing position the plunger 56 will be forced upwardly into the opening by the spring and prevent the handle from reaching the reversing position. Therefore the gear 17 can not be accidently moved into engagement with the reversing gear 18 while the vehicle is moving forwardly and strip the gears. A plunger 61 is slidably mounted through a sleeve 62 projecting from the upper plate about the opening 60 and is formed with a knob 63 so that it may be readily grasped and moved from a lowered to a raised position where it is normally the handle to the reversing position it is merely necessary to press the plunger downwardly to a position in which its lower end fills the opening 60 and the plunger 56 may then pass across the opening and not interfere with movement of the handle to the reversing position.

The drawings illustrate a practical embodiment of the invention but as modifications may be found desirable in commercial exploitation of the invention it is to be understood that I reserve the right to make changes in construction and arrangement of parts which come within the scope of the claims.

Having thus described the invention, what is claimed is:

1. In a transmission including a box and gearing in the box including a main shaft and a gear shiftable along the said shaft to adjusted positions; a lever for moving the gear along the shaft to adjusted positions extending into the box through an opening in a side wall thereof and having its inner end in operative relation to the shiftable gear, plates carried by and extending laterally from said box and between which plates the lever passes, a rocker shaft rotatably mounted through said plates and passing through a slot formed in the lever longitudinally thereof and pivotally and slidably mounting the lever, one of said plates being formed above the lever with a transversely extending slot substantially arcuate longitudinally and having its end portion disposed at an incline towards opposite side edges of the said plate, a rod extending upwardly from said lever and passing through said arcuate slot and carrying a roller disposed in the said arcuate slot, a link having a section firmly mounted upon said rod and formed with a longitudinally extending socket and a second section rigidly carried by said rocker shaft and slidable longitudinally in the socket of the first section, a handle extending laterally from said rocker shaft and means connected with said handle for actuating the same and turning the shaft for moving said link transversely to impart movement to said lever and slide the gear to an adjusted position upon the main shaft.

2. In a transmission including a box and gearing therein including a rotary shaft carrying a gear shiftable along the shaft to adjusted positions; an adjusting lever extending into said box and having its inner end operatively associated with said gear, said lever being formed externally of the box with a longitudinally extending slot, a plate extending from said box parallel to said lever and formed with a transversely extending substantially arcuate slot having end portions disposed at an incline towards opposite side edges of the plate, a rocker shaft journaled through said plate and passing through the slot in said lever and serving to pivotally and slidably mount the lever, a rod carried by said lever and passing through the arcuate slot and carrying a roller disposed in the said arcuate slot, a link having telescoping sections, one section being firmly mounted upon said rod and the other section being rigidly mounted upon said rocker shaft, and means for rotating the rocker shaft and thereby imparting swinging movement to the lever and imparting tilting and sliding movement to the lever for sliding the gear to adjusted positions.

3. In a transmission including a box and gearing therein including a shaft and a gear slidable along the shaft; a lever extending into said box and operatively associated with said gear, said lever being formed with a longitudinally extending slot, a rocker shaft passing through said slot and pivotally and slidably mounting said lever, a member extending from said box substantially parallel to a side of the lever and formed with a substantially arcuate slot having diagonally extending end portions, a rod carried by said lever and passing through said slot and thereby guiding tilting and sliding movement of the lever, a link rigidly carried by said rocker shaft and firmly mounted upon said rod and formed of sections slidable longitudinally of each other, during movement of the link and means for imparting turning movement to said rocker shaft.

4. In a transmission including a box and gearing therein including a shaft and a gear slidable along the shaft; a lever extending into said box and operatively associated with said gear, said lever being formed with a longitudinally extending slot, a rocker shaft passing through said slot and pivotally and slidably mounting said lever, a member formed with a substantially arcuate slot having end portions extending at an incline, a rod carried by said lever and passing through said arcuate slot and carrying a member cooperating with walls of the arcuate slot to guide pivotal and sliding movement of the lever, a link extending radially from said rocker shaft and firmly mounted upon said rod and formed of sections slidable longitudinally of each other, and means for turning the rocker shaft.

OTTAVIO ZANCAN.

No references cited.